Nov. 9, 1954         H. P. KOEHLER         2,693,696
APPARATUS FOR INDUCING CONTROLLED VIBRATION IN A SPECIMEN
Filed May 5, 1951                      2 Sheets—Sheet 1

INVENTOR
H. P. KOEHLER
ATTY.

Nov. 9, 1954   H. P. KOEHLER   2,693,696
APPARATUS FOR INDUCING CONTROLLED VIBRATION IN A SPECIMEN
Filed May 5, 1951   2 Sheets-Sheet 2

INVENTOR
H. P. KOEHLER
ATTY.

2,693,696

APPARATUS FOR INDUCING CONTROLLED VIBRATION IN A SPECIMEN

Harold Peter Koehler, Toronto, Ontario, Canada, assignor to A. V. Roe Canada Limited, Malton, Ontario, Canada, a corporation Application May 5, 1951, Serial No. 224,818

1 Claim. (Cl. 73—67)

This invention relates to apparatus for determining the behaviour of specimens and materials under vibratory loading.

Existing theory on vibratory and fatigue stresses in unsymmetrical bodies is either unreliable or does not lend itself to practical application and consequently design requirements are usually based on empirically acquired data. As a result considerable emphasis has been placed on the development of test apparatus suitable for obtaining this data, and to date this development has been directed primarily towards apparatus operating on magnetic and electrical principles although such apparatus is necessarily complex, and to be tested in it a specimen must either be composed (at least in part) of a metal which lends itself to electromagnetic processes or it must have some such metal attached to it. Attaching extraneous material to the specimen is highly undesirable, however, since it introduces indeterminant stresses which alter the fatigue characteristics of the specimen and defeat the prime requisite of this type of test—exact reproduction under test conditions of the vibratory loading encountered during actual operation. This requirement explains the unsatisfactory results obtained by attempting to reproduce induced vibration in a specimen with a device in which the loading is applied by mechanical means, and it also underscores the importance of mounting the specimen in the test apparatus just as it would be mounted for actual operation so that irrelevant stresses are not introduced.

It is the object of this invention to provide improved apparatus for inducing vibration of desired frequency and amplitude in a specimen.

It is a further object of the invention to provide, in an apparatus for applying vibratory loading to a specimen, means for mounting the specimen and for applying loading without altering the specimen's natural mode of vibration.

It is a further object of the invention to provide apparatus for determining and inducing the natural mode of vibration in a specimen.

It is a still further object of the invention to provide apparatus adapted to apply vibratory loading to a specimen having either magnetic or non-magnetic properties without modifying the specimen.

Figure 1:
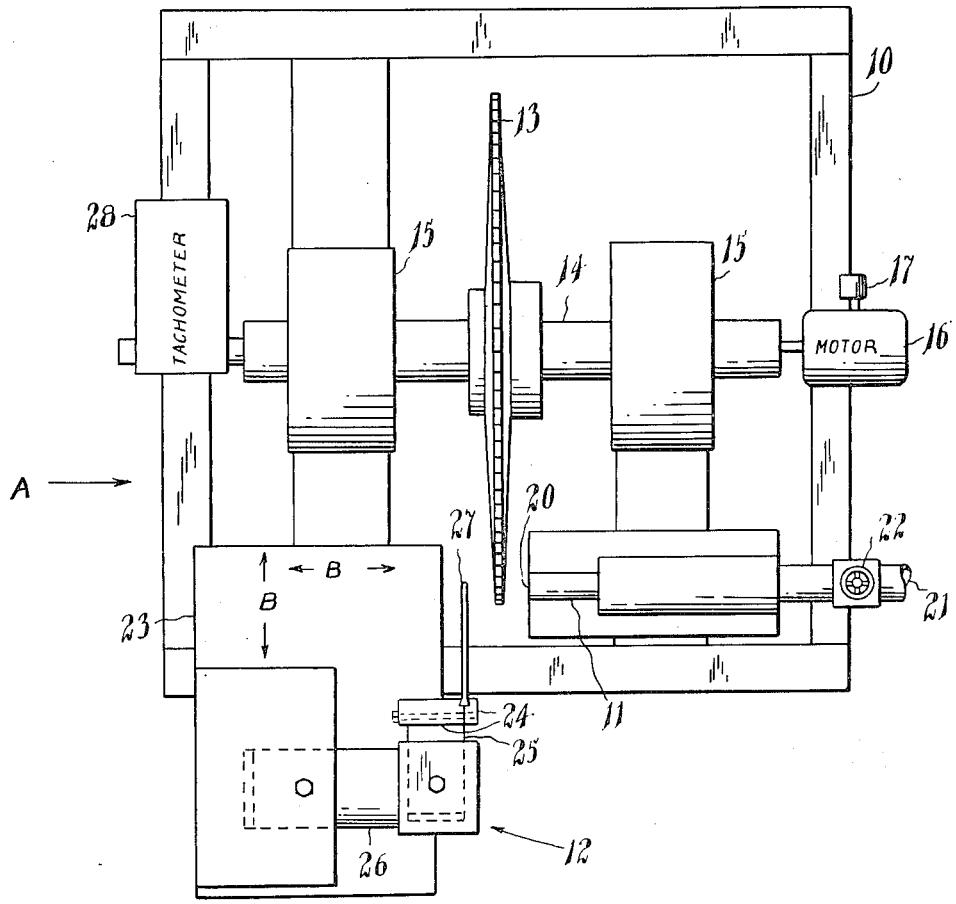
Figure 2:
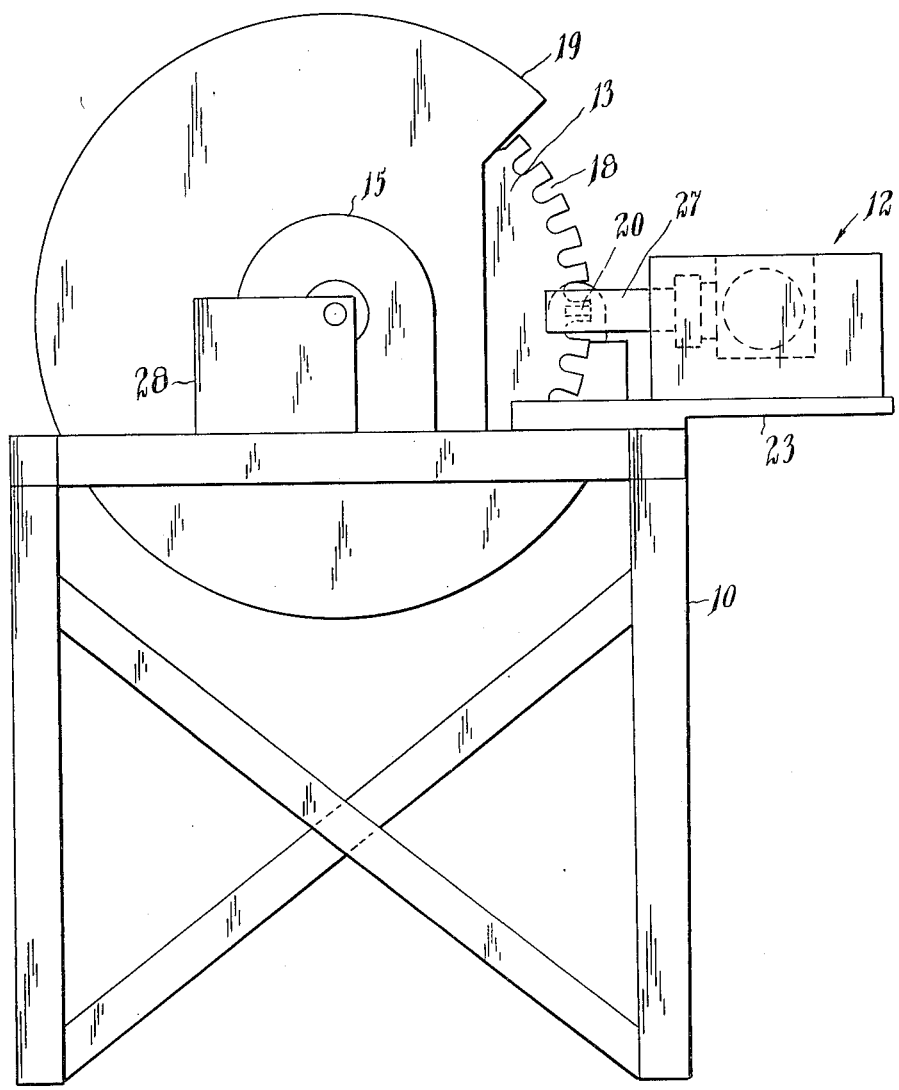

Further objects will become apparent from examination of the following description and drawings of a particular example of the invention. In these drawings like reference characters denote like parts throughout, and Fig. 1 represents a plan view of an apparatus, constructed in accordance with the invention, for testing the vibratory loading in compressor and turbine blades, with the guard removed from around the rotatable disc for greater clarity, and Fig. 2 illustrates a side elevation of the apparatus taken in the direction of arrow A in Fig. 1.

Referring now to the drawings, the apparatus comprises a frame 10 supporting a nozzle 11, a blade-mounting chuck 12 and a disc-shaped member 13.

The disc 13 is carried by a shaft 14 journalled in bearings 15 and driven by a motor 16 regulated by a control 17. Evenly spaced around the rim of the disc's periphery there is a series of irregularities formed by radially directed notches or apertures 18, each notch being the full thickness of the disc and having two of its sides substantially parallel. A guard 19 (shown in Fig. 2 only) is provided to protect the operator from the rotating disc.

The nozzle 11 which is fixed to the frame with its axis parallel to the axis of the shaft terminates in a mouth 20 located in proximity to the notched portion of the disc 13. This mouth is rectangular in cross section and is so disposed that the long side of the rectangle is parallel to the base of the supporting frame 10. The width of the rectangle is less than the distance between the parallel sides of each of the notches 18 in the disc. Air is supplied to the nozzle by a pump (not shown) through a supply line 21 in which there is a regulating valve 22.

The plane of rotation of the disc divides the supporting frame 10 into two portions, one of which carries the nozzle 11 and the other the blade-mounting chuck 12. The chuck is mounted on a plate 23 adapted for positioning on the frame in the directions indicated by the double arrows B in Fig. 1, and it carries a set of jaws 24 supported on rotatable spindles 25 and 26, the one spindle 26 being parallel to the axis of the shaft 14 and the other spindle 25 being perpendicular thereto. The jaws 24 are shaped to conform to the root shape of the specimen blade 27 to be tested, and alternative sets of jaws are provided to accommodate blade roots of differing configuration. The jaws may be removably mounted on the spindle 25 or the spindle 25 may be removable and replaceable by another spindle carrying another set of jaws.

When a blade is to be tested in the apparatus a set of jaws 24 conforming to the root of the blade 27 is placed in the chuck 12 and the blade mounted therein; the chuck is then positioned by adjusting the position of the plate 23 to bring the blade into alignment with the axis of the nozzle 11 and by turning the spindles 25 and 26 the blade is brought into the desired angular position relative to the air stream. The disc 13 is then rotated at constant speed and the valve 22 opened so that a stream of air is ejected from the nozzle.

This stream of air is directed by the nozzle onto the periphery of the adjacent face of the disc and as each of the notches 18 on the disc comes into alignment with the stream in turn, it admits the air which accordingly impinges on the blade, imposing a fluid dynamic load thereon. As the notch passes out of alignment, the fluid stream on the blade is interrupted by the solid peripheral portion of the disc between adjacent notches, and thus there is an intermittent or periodic nature to the loading applied to the blade by the air stream, the frequency of the loading depending upon the number of notches in the disc and the speed at which the disc is rotated. Due to the periodic nature of the applied loading, vibration will be induced in the blade itself and this vibration will have a frequency corresponding to the frequency of the loading. A tachometer 28 is mounted on the frame 10 and operatively linked to the shaft 14 to measure the frequency of the loading, and thus indirectly the frequency of vibration of the blade.

It will be apparent to those skilled in the art that apparatus of the type described can be used both for testing a specimen under conditions duplicating those encountered in actual operation, and for determining the behaviour of a specimen under conditions of resonance.

When actual operating conditions are to be reproduced, for instance conditions affecting a blade in a gas turbine engine, the chuck is located to give the blade the same position relative to the stream from the nozzle that it would have to the relative air stream in its actual installation, in a gas turbine engine and the mass flow of the air through the nozzle 11 is regulated by the valve 22, thus controlling the momentum of the specimen due to the applied loading and hence the amplitude of the blade's vibration (at non-resonant frequencies); if desired, a more accurate control over the pressure and velocity of the air stream emerging from the nozzle may be provided in order to reproduce more closely conditions of actual operation; moreover, by regulation of the disc's speed of rotation through the control 17 it is possible to duplicate the frequencies of the vibration induced in the blade by actual operation at various speeds.

When it is desired to study the behaviour of the blade at the critical frequency, that is at the resonant frequency where the blade is vibrating in its natural mode, the chuck is positioned so that the impinging air stream will produce the maximum amplitude of vibration in the blade for a given loading, and the disc's speed regulated until resonance occurs in the blade as indicated by a sharp increase in the amplitude of vibration.

It is to be understood that the form of the invention herewith shown and described is to be taken as a preferred example of the same and that various changes may be made in the shape, size and arrangement of the parts without departing from the spirit of the invention or the scope of the subjoined claim.

What I claim as my invention is:

Apparatus for inducing controlled vibration in a specimen, said apparatus comprising mounting means for holding the specimen, a nozzle for directing a stream of fluid onto the specimen, a disc rotatably mounted intermediate the nozzle and the mounting means, said disc having a plurality of spaced annularly disposed apertures for periodically admitting the fluid stream on the specimen, means for rotating the disc, a control for selectively regulating the speed of rotation of the disc rotating means and hence for regulating the frequency of fluid admission, and a control for selectively regulating the rate of mass flow of the fluid stream.

References Cited in the file of this patent

UNITED STATES PATENTS

| Number | Name | Date |
|---|---|---|
| 1,322,506 | Austin | Nov. 25, 1919 |
| 2,330,416 | Gibbs | Sept. 28, 1943 |
| 2,554,212 | Quinlan | May 22, 1951 |
| 2,570,081 | Szczeniowski | Oct. 2, 1951 |

FOREIGN PATENTS

| Number | Country | Date |
|---|---|---|
| 579,529 | Germany | June 28, 1933 |
| 471,316 | Great Britain | Sept. 1, 1937 |
| 575,917 | Great Britain | Mar. 11, 1946 |